J. F. PLACE.
ART OR PROCESS OF LIQUEFYING AIR AND SEPARATING THE SAME INTO OXYGEN AND NITROGEN.
APPLICATION FILED NOV. 13, 1911.
1,157,959.
Patented Oct. 26, 1915.
2 SHEETS—SHEET 1.
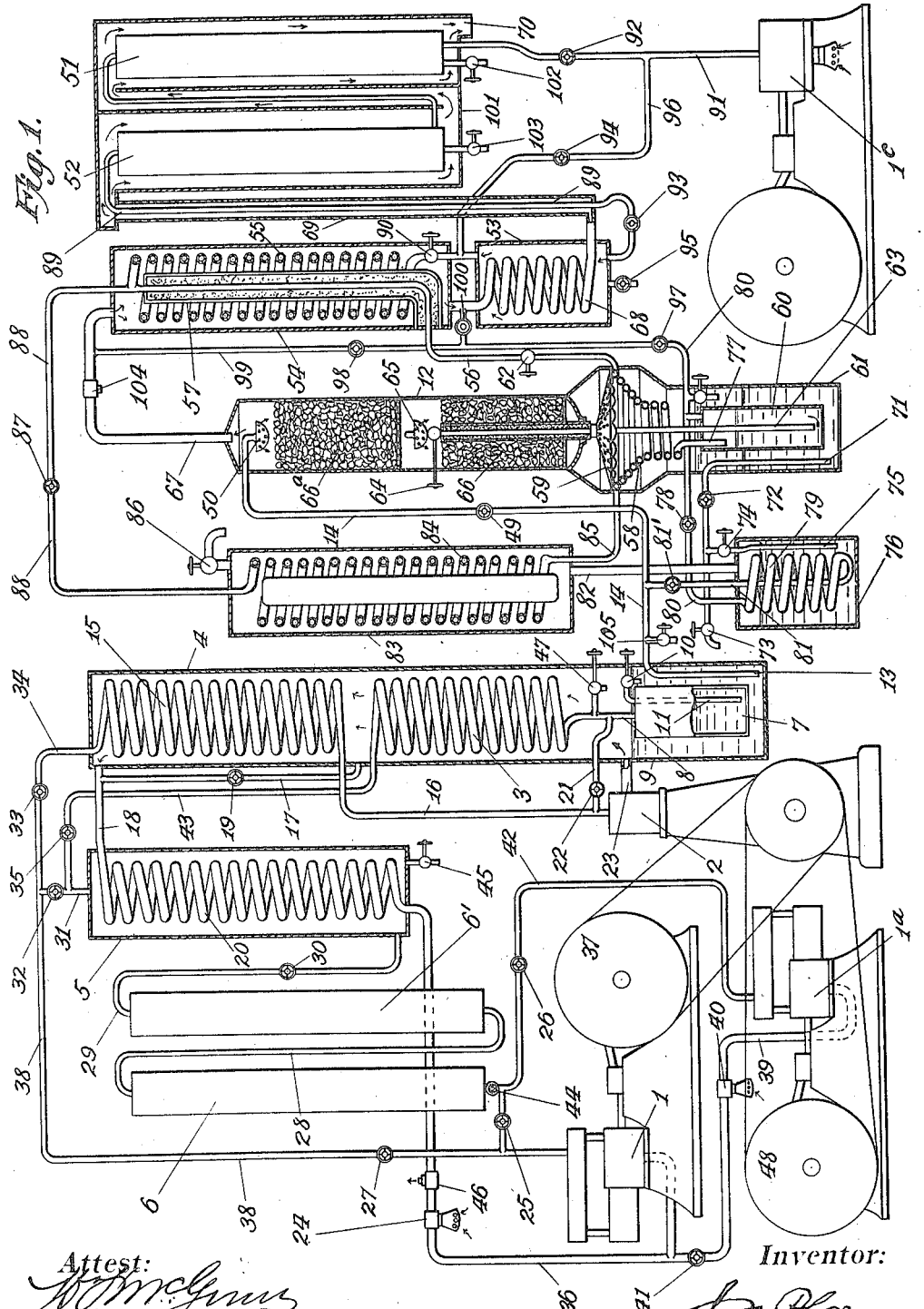
Attest:
Inventor:

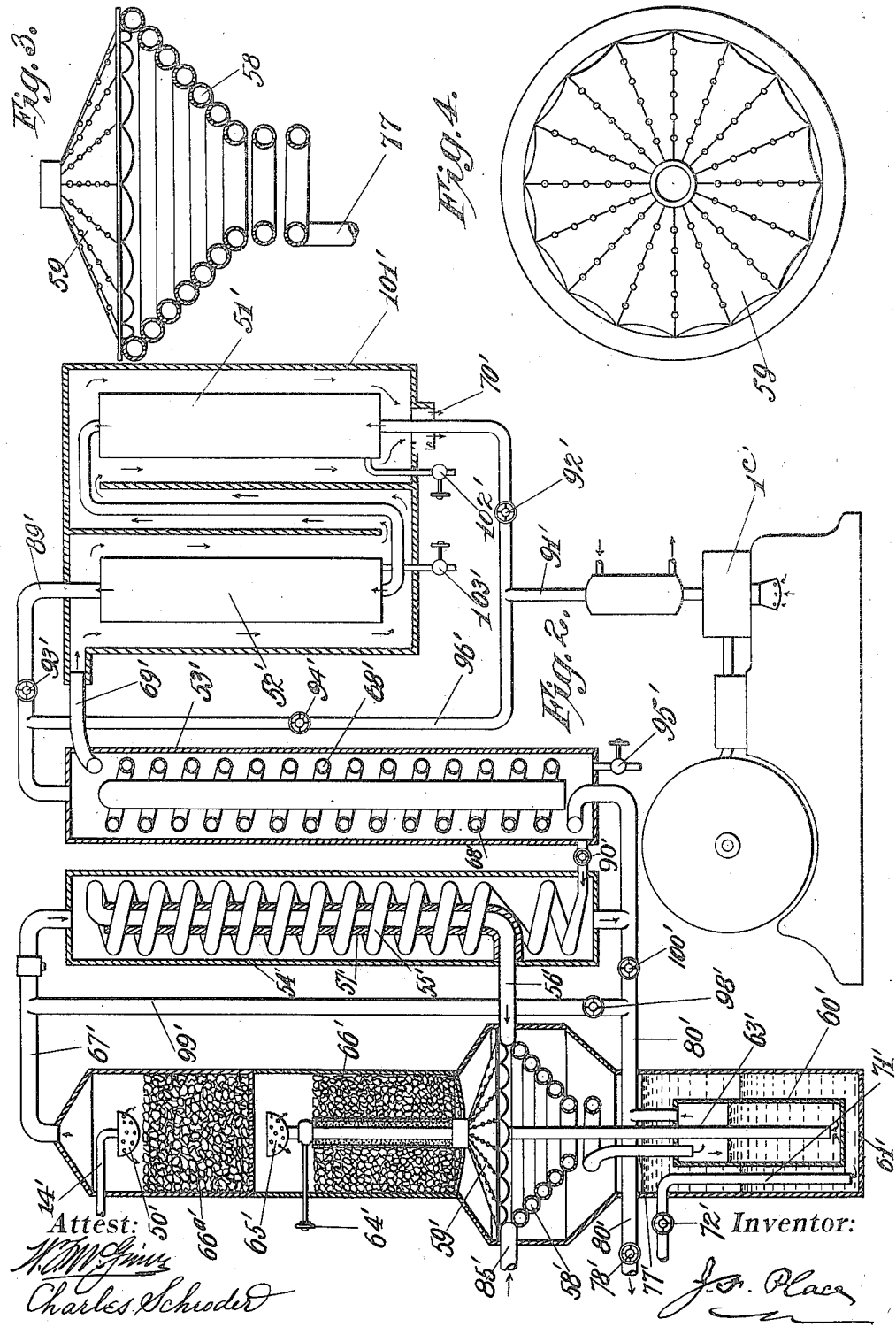

UNITED STATES PATENT OFFICE.

JAMES F. PLACE, OF GLEN RIDGE, NEW JERSEY, ASSIGNOR TO AMERICAN AIR-LIQUEFYING COMPANY, OF NEW YORK, N. Y., A CORPORATION OF NEW YORK.

ART OR PROCESS OF LIQUEFYING AIR AND SEPARATING THE SAME INTO OXYGEN AND NITROGEN.

1,157,959.

Specification of Letters Patent. Patented Oct. 26, 1915.

Application filed November 13, 1911. Serial No. 659,916.

*To all whom it may concern:*

Be it known that I, JAMES F. PLACE, a citizen of the United States, and resident of Glen Ridge, in the county of Essex and State of New Jersey, have invented certain new and useful Improvements in the Art or Process of Liquefying Air and Separating the Same into Oxygen and Nitrogen, of which the following is a specification.

My invention relates to improvements in the art or process of liquefying air and of separating the same into its constituent parts—oxygen and nitrogen; and its principal object is to simplify the process with an accompanying increase in the efficiency of operation and at the same time a decrease in the cost of production of oxygen and nitrogen and also an increase in their purity.

To these and other ends, as will appear from the detailed description which follows, my invention comprehends and consists of the features or steps fully described and explained in connection with the drawings, to which reference should be had for a full and complete understanding of the same, the said invention being particularly pointed out in the claims.

In order that those skilled in the art may understand and make use of my invention I will describe my improved process, by help of the accompanying drawings, by which it may be operated, and in which—

Figure 1 shows in diagrammatic form partly in elevation and partly in vertical section, a complete apparatus whereby the process may be availed of. Fig. 2 is a view in diagrammatic form, partly in vertical section and partly in elevation, of that portion of the above apparatus devoted specially to the separation of the oxygen and nitrogen of air, in a modified form. Figs. 3 and 4 are views on a larger scale of the cone-coil and its radially-grooved deflector—the first in elevation, and the second a top view plan of the deflector only,—forming a part of the separating apparatus.

Similar reference marks refer to similar parts through the several drawings.

In Fig. 1 of the drawings at 1 and 1ª I show ordinary air compressors, to supply the liquefier and the air expansion engine 2; at 1ᶜ is shown the air compressor to supply air of low compression to the rectifier. All of these compressors are driven from an outside source of power, not shown in the drawings. At 3 is shown the liquefying coils of the primary liquefier, inclosed in the casing 4, and in the same casing I show also the cooling coil 15, for cooling the air supplied to the air expanding engine 2— both of which are supplied with compressed air from the freezing drum 5, when only one compressor is used (either 1 or 1ª) to supply both the liquefier and expansion engine. At 6 and 6' I have respectively a calcium chlorid drum and a caustic potash drum, for removing moisture and carbon dioxid from the air. At 7 I have a high-pressure liquid air tank or container, for taking the liquefied air as produced in the liquefying coils 3, as it falls by gravity through the connecting pipe 8; and at 9 I show a low-pressure liquid air holder. The liquid in the container 7 is under same compression as when liquefied, and is partially released from pressure by the releasing valve 10, and is delivered to the holder 9 through the siphon tube 11; the pressure in the casing 4 and holder 9 is maintained at a few pounds only—just enough to force the liquid up into the rectifying column 12 through the siphon 13 and discharge pipe 14. When the liquid is released from the container 7 and delivered to the holder 9, the container 7 becomes submerged in the released liquid in said holder, which subcools any further liquid under pressure in said container; and any of the liquid which evaporates when released or partially released from pressure through valve 10, goes up through the casing 4 and helps cool or liquefy the incoming compressed air.

The expansion engine 2 is supplied with compressed air, which has been cooled in the interchanger coils 15, through the feed pipe 16; in order to easily regulate the initial temperature of this air to be expanded in the engine, I have a cut-out conduit 17, from the casing 4 to the return flow conduit 18, through the valve 19; any of the cold expanded air which is passed through this cut-out conduit goes direct into the freezing coil 20 in the freezing drum 5, and therefore the air supplied to the engine through the interchanger 15 is not cooled to so low a temperature; to further regulate the temperature of this air to be expanded, I have a feed pipe 21, so that some of the unliquefied gases which pass through the liquefying coils 3, may also be delivered to the engine through valve 22, in case the initial temperature of the air to be expanded requires to be lowered. It is very important to be able to govern this initial temperature of the air supplied to the engine 2 for expansion therein, for upon that initial temperature depends the temperature of the exhaust expanded air as it is delivered to the casing 4 through the exhaust conduit 23. Preferably I maintain the temperature of this initial compressed air supplied to engine 2, so that as it expands the temperature of the exhaust air is down to its liquefying point, and thus the expanded air as it ascends in the casing 4 around the liquefying coils 3, and in thermal contact with and in counter-current to the air supplied to and being cooled and liquefied therein, it is so much colder than the liquefaction temperature of the air in said liquefying coils, that the compressed air therein readily becomes liquefied, and the liquid drips down through pipe 8 and is collected below in the high-pressure container 7. For, in the operation of my process, the lower the pressure which can be maintained in the liquefying coils 3 to permit of successful working, the greater is the efficiency.

The operation of that part of the apparatus devoted to the liquefaction of air or other gaseous mixtures, is as follows: When two pressures are used, the air to be expanded in the air-expansion engine is compressed in compressor 1, being drawn in through the suction check valve 24, and after compression it is water-cooled and sent through valves 25 and 44 (valves 26 and 27 being closed); thence it passes through the calcium chlorid drum 6, and much of the moisture therein being absorbed, it is conducted through pipe 28, to the caustic potash drum 6' wherein the carbon dioxid in the air is removed, and from thence it passes through pipe 29 and valve 30 into the freezing drum 5, wherein all of the remaining moisture in the air is frozen out, and gathers as frost on the outside surfaces of the low pressure metal conduit 20—the cold expanded air in the conduit 20 being arranged to pass downwardly through the conduit, and the compressed air in the drum 5 passing upwardly in counter-current thereto. The compressed air to be expanded is then sent through the connecting pipe 31 and valve 32, into the cooling coils 15 through valve 33 and pipe 34, the valve 35 being closed; in the cooling coils 15, it passes downwardly in a contrary direction to the cold expanded air and vapors passing up through the casing 4, and being properly cooled therein by thermal but not physical contact with said ascending cold expanded gases and vapors it is delivered through pipe 16 to engine 2, wherein it is suitably expanded, and the cold exhaust expanded gases are then delivered through conduit 23 to the casing 4, just below the liquefying coils 3; thence these cold expanded gases pass through the conduit 18 and freezing coils 20 to the return conduit 36, and are thence delivered to the compressor 1, and recompressed, the same air being used over and over again. The engine 2 is belted to the compressor 1 as shown at 37 and the work thereof is recovered in helping to compress the air used.

After the apparatus is properly cooled the drums 6 and 6' and freezing drum 5 are cut out from the circuit, by closing valves 25 and 32, and opening valves 27, valve 33 being already open, when the compressed air now thoroughly dry and free from $CO_2$ gas is made to pass through the cut-out pipe 38 and valve 33 direct to the counter-current cooling coils 15. The other compressor 1$^a$, for supplying air of higher tension, to the liquefier, may then be started up, drawing air in through the suction pipe 39 and check valve 40—valve 41 (which connects the suction pipes of the two compressors) being closed. This higher-pressure air is then delivered through discharge pipe 42 and valves 26 and 44 to the hydroscopic drums 6 and 6', and the freezing drum 5, thence through valve 35 (valves 32 and 25 being closed, and valve 30 opened) through supply pipe 43 to the high-pressure liquefying coils 3, wherein it is liquefied by the cold expanded gases from the engine exhaust conduit 23, and drips by gravity through connecting pipe 8 into the container 7.

By closing valves 44, 30, 35 and 33, and opening valves 25, 27, and 32, and drip cock 45, hot air from the compressor 1$^a$ may be sent through the freezing drum 5, and the frost on the conduit 20 melted and drained out through the drip cock 45. At 46 I have a relief valve, to allow any surplus gas in conduit 36 to escape, and set so as to force a suitable back-pressure in the casing 4; and at 47 I have a pressure-releasing valve, whereby some of the unliquefied gases from the liquefying coils 3 may be released to the casing 4 to go back over and help cool and liquefy the incoming compressed air in said liquefying coils, if desired. Ordinarily this valve is not used.

When only one pressure is desired to supply both the expansion engine and the liquefier, preferably compressor 1$^a$ is used, and valves 26, 30, 32, 33, 35, 41 and 44 are opened, and valves 25 and 27 are closed; all of the compressed air is then passed through the drums 6 and 6', and the freezing drum 5, and is delivered one portion through valve 33 to the cooling coils 15 to be expanded, and the other portion through valve 35 to the liquefying coils 3 to be liquefied. When only compressor 1ª is used, the engine should be made to do work on that compressor, by belt as shown at 48.

Having produced the liquid air and released the same to the low-pressure holder 9 it is then delivered to the top of the rectifying column 12 through siphon 13, valve 49 and pipe 14 and the spray head 50; from thence it falls and drips down the column 12 through the pebbles or glass balls 66ª. The rectifying apparatus consists of the following parts: At 1ᶜ is the low-pressure compressing the air to a suitable tension, ordinarily not over one to three atmospheres; and at 51 and 52 I have the moisture and $CO_2$ gas extracting drums, respectively, similar to the drums 6 and 6', and at 53 I show a low-pressure freezing drum, also similar to that used in the liquefying process. At 54 I have a counter-current cooling casing, with the cooling coil 55 inclosed therein to cool the low-tension compressed air being conducted therethrough (in a contrary direction to the return flow of cold expanded air in the casing 54), to be used in the rectifying process; the cold pipe 56 (containing air about to be liquefied) is preferably insulated as shown at 57. The air of light compression from the compressor 1ᶜ, is first cooled and then passed through discharge pipe 91 and valve 92 to the hydroscopic drums 51 and 52, and thence through pipe 89 and valve 93 to the freezing drum 53, and thence through valve 90 to the interchanger coils 55. Within the rectifying column 12, I have my improved cone-coil liquefier 58, which is more clearly shown in Fig. 3, surmounted by my improved radially grooved rectifying deflector 59. And at 60 is shown my improved liquid holding and separating container, which is wholly or in part submerged in the released oxygen liquid in holder 61. Cold pipe 56 is connected with and delivers to the cone-coil liquefier, preferably to the upper coil thereof as shown, and through valve 62. The liquid obtained in the cone liquefier, as collected in the container 60 through discharge pipe 77 is discharged through the siphon pipe 63 through valve 64 and the spray-head 65; it then mingles with the descending liquid air discharged from the spray-head 50, higher up, and drips down through the pebbles or balls 66 on to the deflector 59, and over the outer surfaces of the helical coils on the inside or within the hollow cone of the cone-coil liquefier 58, and finally is collected in the holder 61—having in its fall from the head 65 become rectified to practically pure oxygen liquid, the nitrogen gas passing off through conduit 67 to the cooling interchanger 54, and down through the freezing coil 68 and up through the conduit 69 and down around the drums 52 and 51, and through the outlet 70.

The liquid oxygen collected in the holder 61, may be drawn out through the siphon tube 71 and valve 72 and delivery cock 73; or it may be delivered through the valve 74 and tube 75 to the oxygen vaporizing reservoir 76. The liquid obtained in the container 60 is separated from the unliquefied gaseous residue in the top of said container, both liquefied and unliquefied being delivered from the liquefying cone coils through the connecting pipe 77. From here the unliquefied gaseous residue may be sent through valve 78 and pipe 80 to the liquefying coil 79 in the reservoir 76, where it is liquefied by giving up heat in evaporating the oxygen liquid in said reservoir, and as liquefied it is forced up through pipe 81 and valve 81' into pipe 14 and is mixed with the liquid air therein from holder 9 and delivered therewith through spray-head 50 to the top of the rectifying column 12, to be rectified as it falls down through the column. The oxygen liquid in reservoir 76 is thereby evaporated and the practically pure oxygen gas passes up through conduit 82 into the drum 83 where it further cools the compressed air in the coil pipe 84 therein and such cool air passes down through pipe 85 into the cone-coil liquefier 58 as shown. The oxygen gas may then be collected from the outlet cock 86. The coil 84 is supplied with cooled and dry compressed air through valve 87 and connecting pipe 88, which is fed from the primary interchanger cooling coils 55. The moisture frozen out from the air in drum 53, may be removed by closing valves 90, 92 and 93 and opening valve 94 and drip cock 95, and passing warm or hot air from the compressor through the by-pass 96 to the freezing drum 53.

At 97 I have a valve connecting pipe 80 through valve 98 with the pipe 99 which delivers to the nitrogen escape conduit 67, so that portions of the unliquefied gaseous residue as separated from the liquid in container 60, may be sent direct to the interchanger drum 54, if desired, or when the oxygen liquid is drawn off from outlet 73, and not vaporized in the vaporizing reservoir 76. Some of this cold unliquefied gaseous residue may be passed through valve 100 direct into the freezing coil 68, if desired. The drums 51 and 52 are inclosed in an insulating case 101, and are each provided with a drip cock 102 and 103. I also provide a check valve 104 in the nitrogen return flow conduit 67, so as to maintain a slight back-pressure in the rectifying column and holder 61; and by having the outlet valve 105, liquid air before rectification may be drawn out from the holder 9 through siphon tube 13, if desired.

In Fig. 2 I have illustrated a modified construction of that portion of the apparatus employed by me in the carrying out of my process for the purpose of cooling and liquefying the air under low compression and rectifying the same. In the said modified construction 1ᶜ, as in Fig. 1, designates a compressor in which the air is placed under a low degree of pressure or compression and from which it is conducted through the pipe 91′ and valve 92′ into and through the drums 51′ and 52′, which are similar to the drums 6 and 6′ in Fig. 1, and which are provided with means for extracting the moisture and $CO_2$ from the air. From the drum 52′ the air is conducted through the pipe 89′ and valve 93′ into the low pressure freezing drum 53′. From this drum the air is conveyed through coiled pipe 55′ which is situated within the casing 54′. The pipe 55′ consists of the coiled portion and a straight portion extending through such coiled portion, the said straight and coiled portions being separated from each other by means of a casing of insulation 57′ which surrounds the straight portion of the pipe. The straight portion of the pipe is extended as indicated at 56′ and is preferably connected, as shown, to the upper part of the liquefying coil 58′ in which liquefaction in part or in whole of the air is effected by reason of the fact that it is subjected to the action of the cold rectified liquid from the rectifying column 66′.

The liquefied gas, as well as any portion thereof which is not liquefied, is delivered from the coil 58′ through pipe 77′ to the receiver 60′. From this receiver the liquefied portion of the air passes out through the pipe or tube 63′, the valve 64′ being opened to permit such outward passage, and is discharged therefrom through the nozzle 65′ which is located in the rectifying column 66′. The liquid thus discharged mixes and intermingles with the downwardly flowing liquid which has been discharged from the nozzle 50′ as the liquid flows downward through the pebbles or glass balls 66ᵃ′ in the rectifying column. The nitrogen being the more volatile is separated from the oxygen in the rectifying column and passes from such column through the pipe 67′ and enters the casing or drum 54′ moving downwardly therein, surrounding the cooling pipe 55′. From the casing 54′ the cooled gas passes out through the pipe communicating therewith and passes thence into the coiled pipe 68′ in the low pressure freezing chamber 53′ from which it passes through the pipe 69′ into the casing 101′ through which it travels, surrounding the drums 52′ and 51′, finally escaping through the discharge opening 70′.

It will thus be seen that the air under low compression which is forwarded from the compressor 1ᶜ is caused to flow in a direction opposite to that of the flow of the cold gases so that it is thereby rendered very cold previous to the time that it enters the liquefying coil 68′. It may be noted that the vessel 60′ is situated in a vessel or container 61′ and that it is surrounded by the rectified liquid which is contained therein. The liquid from the container 61′ may be removed therefrom through a pipe 71′ and valve 72′ in the same manner as described in connection with the container 61 and parts 71 and 72 in Fig. 1 of the drawings; or instead of passing out through the valve 78′ the latter may be closed and the valve 98′ opened, the valve 100′ being closed so that the unliquefied portion of the air or gas is conducted through the pipe 99′ which delivers the same into the pipe 67′; or instead of passing such unliquefied portion of the air through the valve 98′ the latter may be closed and the valve 100′ opened in which case the said unliquefied portion will travel toward the right through the coil pipe 68′ as previously described in connection with the gas escaping through the pipe 67′ from the rectifying column 66′.

95′ designates a drip cock from the low pressure freezing drum 53′.

102′ and 103′ designate drip cocks from the drums 51′ and 52′.

The moisture frozen out from the air in drum 53′ may be removed by closing valves 90′, 92′ and 93′ and opening valve 94′, drip cock 95′ and passing warm air from the compressor through the by-pass 96′ to the freezing drum 53′.

All parts of the apparatus having a temperature below normal when in operation, are thoroughly insulated with suitable materials of low thermal conductivity.

Having thus described my invention, what I claim as new and original and desire to secure by Letters Patent, is—

1. The process of liquefying atmospheric air, which consists in compressing the air, cooling the same, and liquefying a part of one portion thereof and expanding with production of recoverable external work the unliquefied gaseous residue of such portion along with the other portion; and finally partially releasing from pressure the liquid thus obtained and sub-cooling therewith the unreleased liquid.

2. The process of liquefying atmospheric air, which consists in compressing the air, cooling the same, and expanding a portion thereof with production of recoverable external work, and then liquefying under pressure a part of the other portion by the combined refrigerative effect of the cold expanded portion and the unliquefied gases of the other portion; and finally partially releasing from pressure portions of the liquid thus obtained and sub-cooling therewith the unreleased portions thereof.

3. The process of liquefying atmospheric air, which consists in compressing the air, cooling the same, and liquefying a part of one portion thereof and expanding with production of recoverable external work the unliquefied gaseous residue of such portion along with the other portion; and finally partially releasing from pressure portions of the liquid thus obtained and sub-cooling therewith the unreleased portions thereof.

4. The process of liquefying atmospheric air which consists in compressing portions of air, cooling the same and liquefying a part of one of said portions and expanding the unliquefied gaseous residue of such portion along with the other of said portions and finally partially releasing from pressure the liquefied gases of the air thus obtained and utilizing the cold vapors from such as evaporate upon said release to cool the incoming supply of compressed air.

5. The process of liquefying atmospheric air which consists in compressing portions of air, cooling the same, and liquefying a part of one of said portions and expanding with production of recoverable external work the unliquefied gaseous residue of such portion along with the other of said portions and finally partially releasing from pressure the liquefied gases of the air thus obtained and utilizing the cold vapors from such as evaporate upon said release to cool the incoming supply of compressed air.

6. The process of liquefying atmospheric air which consists in compressing portions of air, cooling the same and expanding one of said portions and then liquefying under pressure a part of the other portion by the combined refrigerative effect of the cold expanded portion and the unliquefied part of the said other portion and finally partially releasing from pressure the liquid thus obtained and sub-cooling therewith the unreleased liquid.

Signed at New York city in the county of New York and State of New York this 8th day of November A. D. 1911.

JAMES F. PLACE.

Witnesses:
G. JOHNSON,
FREDERICK B. BLACKMAN.